United States Patent
Wang

(10) Patent No.: US 12,181,558 B2
(45) Date of Patent: Dec. 31, 2024

(54) METHOD FOR ESTIMATING OBJECT ANGLE WITH HIGH-ANGLE ANALYSIS USING LARGE-SCALE MIMO ARRAY ANTENNA

(71) Applicant: CUBTEK INC., Zhubei (TW)

(72) Inventor: Hsiao-Ning Wang, Hsinchu County (TW)

(73) Assignee: CUBTEK INC., Zhubei (TW)

( * ) Notice: Subject to any disclaimer, the term of this patent is extended or adjusted under 35 U.S.C. 154(b) by 445 days.

(21) Appl. No.: 17/728,381

(22) Filed: Apr. 25, 2022

(65) Prior Publication Data

US 2023/0128625 A1    Apr. 27, 2023

(30) Foreign Application Priority Data

Oct. 27, 2021    (TW) .................................. 110139954

(51) Int. Cl.
*G01S 13/42*    (2006.01)
*G01S 13/02*    (2006.01)

(52) U.S. Cl.
CPC ....... *G01S 13/42* (2013.01); *G01S 2013/0245* (2013.01)

(58) Field of Classification Search
CPC .................. G01S 13/42; G01S 2013/0245
See application file for complete search history.

(56) References Cited

U.S. PATENT DOCUMENTS

| | | | |
|---|---|---|---|
| 8,761,274 B2* | 6/2014 | Lopez de Victoria | H04L 25/0224 375/316 |
| 9,762,414 B2* | 9/2017 | Lopez de Victoria | H04L 25/0212 |
| 11,002,819 B2* | 5/2021 | Wittenberg | G01S 7/292 |
| 11,808,846 B2* | 11/2023 | Zhang | G01S 13/42 |
| 2012/0121045 A1* | 5/2012 | Kuwahara | H04B 7/0413 375/341 |
| 2015/0219756 A1* | 8/2015 | Ishimori | B60W 30/14 342/147 |
| 2017/0315221 A1* | 11/2017 | Cohen | G01S 13/42 |
| 2018/0128892 A1* | 5/2018 | Granato | G01S 3/043 |
| 2021/0286069 A1* | 9/2021 | Kim | G01S 13/72 |
| 2022/0113399 A1* | 4/2022 | Li | G01S 13/931 |
| 2022/0120847 A1* | 4/2022 | Zhang | G01S 7/032 |
| 2022/0187424 A1* | 6/2022 | Abatzoglou | G01S 7/418 |
| 2022/0252696 A1* | 8/2022 | Rosu | G01S 13/42 |
| 2022/0268883 A1* | 8/2022 | Wu | G01S 7/356 |

(Continued)

*Primary Examiner* — Peter M Bythrow
(74) *Attorney, Agent, or Firm* — Birch, Stewart, Kolasch & Birch, LLP

(57) ABSTRACT

A method for estimating object angle with high-angle analysis using a large-scale MIMO array antenna, wherein the array antenna receives the input signal matrix which is the transmission or reflection signal of at least one object. The method includes: step S1: inputting the input signal matrix to a first calculation model to obtain a target object amount and a rough object angle with respect to the location thereof; step S2: inputting the object amount and the input signal matrix to a second calculation model for singular value decomposition to obtain a noise matrix; step S3: obtaining an iteration angle range from the rough angle in S1; step S4: inputting the plurality of pursuit matrices corresponding to the iteration angle range and the noise matrix to a third calculation model for angle range iteration, thereby acquiring an accurate object angle.

16 Claims, 6 Drawing Sheets

(56) References Cited

U.S. PATENT DOCUMENTS

| | | | | |
|---|---|---|---|---|
| 2022/0268884 A1* | 8/2022 | Wu | ............... | G01S 13/34 |
| 2022/0268911 A1* | 8/2022 | Wu | ............... | G01S 7/41 |
| 2023/0161021 A1* | 5/2023 | Bekooij | ............ | G01S 13/06 |
| | | | | 702/151 |

* cited by examiner

METHOD FOR ESTIMATING OBJECT ANGLE WITH HIGH-ANGLE ANALYSIS USING LARGE-SCALE MIMO ARRAY ANTENNA

BACKGROUND OF THE INVENTION

1. Field of the Invention

The present invention relates to estimation methods, and more particularly, to a method for estimating object angle with high-angle analysis using large-scale MIMO array antenna.

2. Description of the Related Art

Antenna modules are widely used in modern society. For example, in the fields of wireless communication and radar detection, antenna modules are usually applied to transmit and receive wireless signals for signal transmission or position detection. In a multi-antenna signal source environment, it is desirable to resolve the issues of mutual interference among signals, the best signal transmission path, and selection of the optimal signal source in the technical field of antennas.

For instance, mobile phones used by the public transmit network signals and telecommunication signals through the connection between the antennas and the base stations. Therefore, the method of selecting a base station providing better signal connection among a plurality of base stations with different distances and different transmission paths for obtaining better telecommunication signals and network signals becomes an issue needing to be solved in the field of mobile phone communication. In another example, a car radar detection system is mainly applied for detecting objects around the vehicle, so as to confirm and recognize obstacles, thereby assisting the driver to avoid the risk of collision, or even facilitating an automatic driving function. The detection principle of the radar system of vehicle is detecting the distance between the vehicle and the objects around the vehicle through the radar antenna during the moving process of the vehicle. The solution of conventional radar works based on two to three transmitting antennas and three to four receiving antennas. The imaging radar applies a plurality of multiple-input multiple-output (MIMO) antenna arrays for mapping the surrounding environment with high-resolution, thereby providing highly precise image quality without Doppler fuzzy sensing issues under any external environmental conditions and helping to achieve long-distance and wide-view decision making to avoid collisions between the vehicle and an object or another vehicle, so as to prevent traffic accidents.

Regarding the aforementioned technology of searching the most optimal signal for mobile phones and base stations, based on the fact that the signal searching operations of mobile phones and base stations is less related to urgent and dangerous situations, the target signal detection method used by the radar antenna of mobile phone can apply a signal detection method with longer calculation time for repeatedly searching the locations of the base stations and identifying the signal strength of the base stations, so as to receive a stronger signal. Moreover, the position of the base station is fixed, so that the position of the base station is easier to be identified.

However, the radar antenna of the vehicle is applied for preventing collisions during the movement of the vehicle, so that the vehicle radar antenna has to accurately detect the amounts and locations of objects in a short period of time. Therefore, a more accurate and efficient signal calculation method is needed for abovementioned objectives.

SUMMARY OF THE INVENTION

The present invention aims at resolving the issue of that the conventional target signal detection method is unable to accurately identify the position of the target object and the detection calculation time period thereof is relatively longer.

For achieving the aforementioned objectives, the present invention provides a method for estimating object angle with high-angle analysis using large-scale MIMO array antenna, which receives an input signal matrix through an array antenna, wherein the input signal matrix is a transmission signal or reflection signal of at least one target object. The method for estimating object angle with high-angle analysis using large-scale MIMO array antenna comprises following steps: step S1: inputting an input signal matrix to a first calculation model, and inputting a plurality of angle related pursuit matrices for comparison; when the plurality of pursuit matrices satisfy conditions of the first calculation model, a target object amount and a rough object angle with respect to a location of a target object are obtained; S2: inputting the target object amount and the input signal matrix to a second calculation model for carrying out a singular value decomposition to obtain a noise matrix; S3: obtaining an iteration angle range from the rough object angle in S1; S4: inputting the plurality of pursuit matrices corresponding to the iteration angle range and the noise matrix to a third calculation model for an angle range iteration, thereby obtaining an accurate object angle.

With such configuration, by combining the first calculation model, the second calculation model, and the third calculation model, the present invention accurately obtains information related to the target object amount and the angle thereof, and increases the calculation efficiency, allowing the present invention to be applied to various equipment.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Radar array antennas have various usages, such as object detection, weather observation, object tracking, and so on. The radar array antenna used for detecting objects also applies different algorithms, such as orthogonal matching pursuit (OMP), MUltiple SIgnal Classification (MUSIC), and iterative sparse asymptotic minimum variance (SAMV) for signal identification and calculation.

The object detection method of orthogonal matching pursuit (OMP) first compares the correlation between the input signal matrix (reflection signal of the target object received by the radar array antenna) and angle-related steering vector, and then calculates residual value through the residue analysis in regression analysis according to the correlation between the input signal matrix and the steering vector, so as to obtain the amount and the positional angle of the object. OMP has the property of fast calculation. However, to achieve the fast calculation, the detection accuracy of OMP is not optimal. In other words, OMP can only identify the target object in a certain angular range, instead of obtaining a precise angle information of the target object.

The object detection method of MUltiple SIgnal Classification (MUSIC) first converts the reflection signal of the target object received by the radar array antenna into a covariance matrix, and carries out a Singular Value Decomposition (SVD) according to the amount of the target object and the covariance matrix to obtain a noise matrix, and finally carries out the iteration with the noise matrix and an angle related steering vector, thereby obtaining the angle information of the target object. The MUSIC is able to obtain a highly accurate angle information. However, to obtain a highly accurate angle information, the MUSIC has to deal with a huge amount of calculation, so that the calculation speed of MUSIC is relatively slow. Also, the MUSIC has to acquire the amount of the target object in advance before carrying out the calculation. Therefore, the MUSIC can only be applied in a relatively limited scope.

Figure 1:
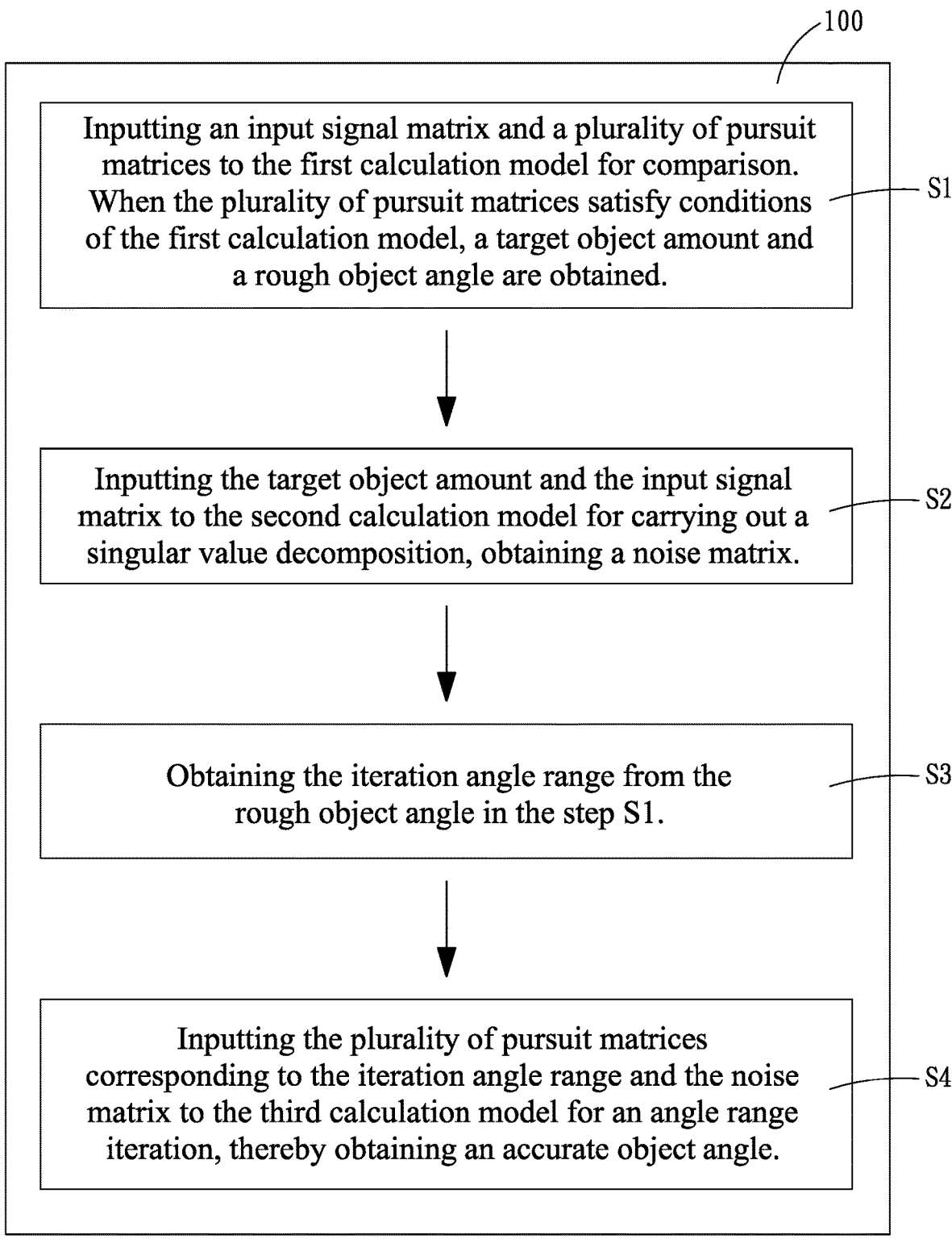
FIG. 1 is a flow chart of the method for estimating object angle with high-angle analysis using large-scale MIMO array antenna in accordance with an embodiment of the present invention.
Figure 2:
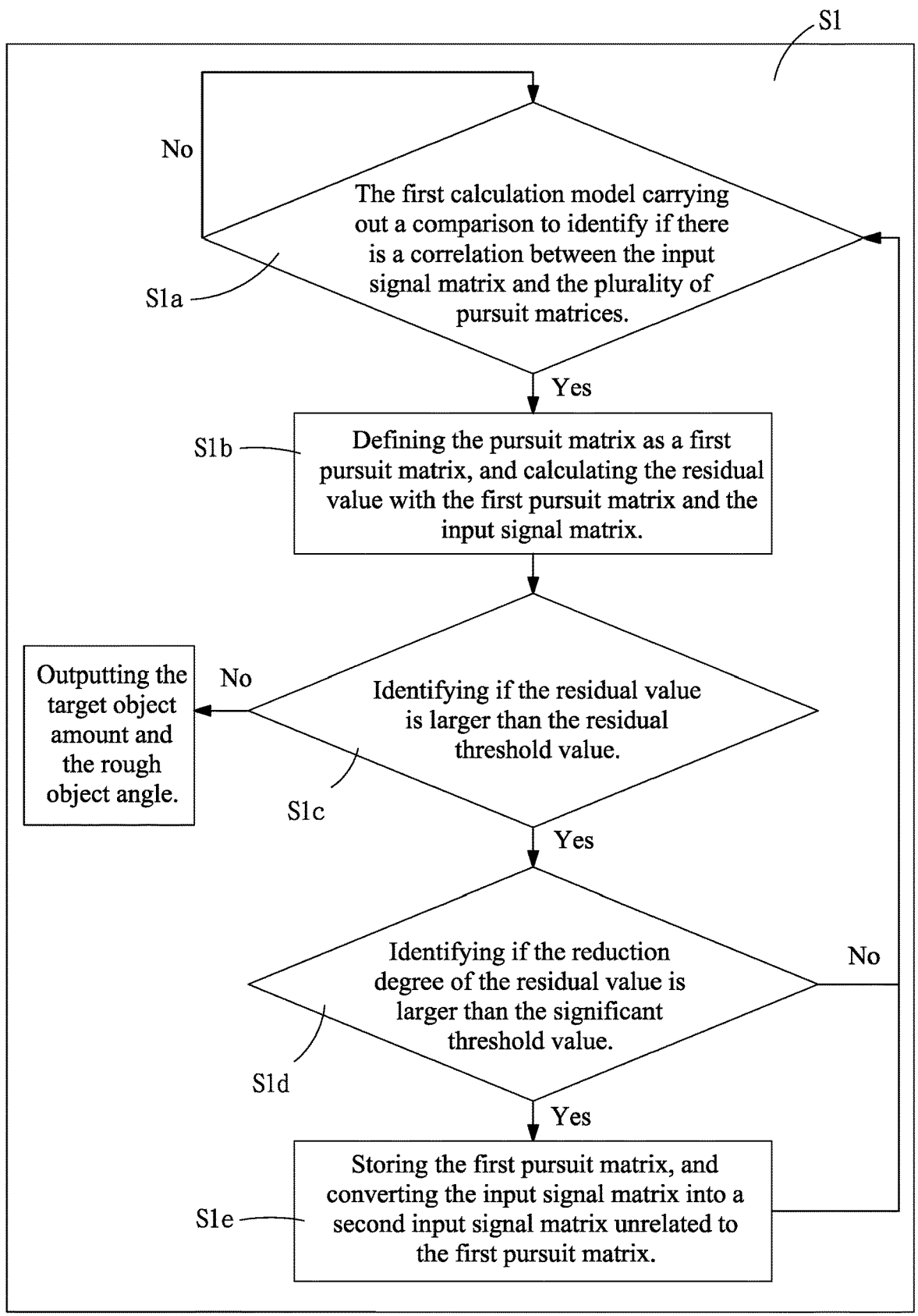
FIG. 2 is a detailed flow chart of step S1 in accordance with an embodiment of the present invention.

Referring to FIG. 1 and FIG. 2, the method for estimating object angle with high-angle analysis using large-scale MIMO array antenna 100 in accordance with an embodiment of the present invention receives an input signal matrix through an array antenna, wherein the input signal matrix is the transmission signal or reflection signal of at least one target object. Therein, in the embodiment, the array antenna is a multi-input multi-output (MIMO) array antenna, which uses multiple antennas on the transmission end to transmit a signal, respectively, and uses multiple antennas on the receiving end to receive and recover original information at the same time. The input signal matrix is obtained from the reflection signal which is reflected by the target object and received by the radar array antenna disposed on the vehicle, so as to be applied in an advanced driver assistance system (ADAS), for example but not limited to, being used for forward collision warning (FCW) or blind spot detection (BSD) functions. The method of the present invention can be used for the detection of number, location, and angle of the target objects. The present invention can also be applied for identifying connections between the mobile phone and the base stations. Regarding connection signal of mobile phones, the mobile phone needs to perform the connection detection with respect to a plurality of base stations to determine the optimal base station for connection, so that the method of the present invention is applicable as well. The present invention comprises following steps:

Step S1: inputting the input signal matrix to a first calculation model (such as orthogonal matching pursuit, OMP), and inputting a plurality of angle related pursuit matrices for comparison. When the plurality of pursuit matrices satisfy conditions of the first calculation model, a target object amount and a rough object angle with respect to a location of a target object are obtained. Therein, the plurality of pursuit matrices are formed of angle related steering vectors. The steering vector is resented as formula (1)

$$v(k) = \begin{bmatrix} e^{-jk\sin\theta_1} \\ e^{-jk2\sin\theta_2} \\ \vdots \\ e^{-jkn\sin\theta_n} \end{bmatrix} \quad (1)$$

Therein, the v(k) is the steering vector.

In the embodiment of the present invention, a step S1$a$, step S1$b$, step S1$c$, step S1$d$, and step S1$e$ are used to identify if the plurality of pursuit matrices satisfy the conditions of the first calculation model. Steps S1$a$, S1$b$, S1$c$, S1$d$, and S1$e$ are illustrated below:

Step S1$a$: the first calculation model comparing if there is a correlation between the input signal matrix and the plurality of pursuit matrices. If there is no correlation between one of the plurality of pursuit matrices and the input signal matrix, step S1$a$ is repeated for carrying out the correlation comparison between the next plurality of pursuit matrices and the input signal matrix. If there is a correlation between one of the plurality of pursuit matrices and the input signal matrix, S1$b$ is then performed.

Further, the angle of the plurality of pursuit matrices ranges from −90 to 90 degrees; the corresponding plurality of pursuit matrices are orderly compared with the input signal matrix for correlation comparison based on a first interval angle unit. Therein, the correlation comparison compares the angular correlation between the plurality of pursuit matrices and the input signal matrix. The value of the first interval angle ranges from $\frac{1}{18}$ and $\frac{1}{180}$ (1 degree to 10 degrees) of the angle range of the plurality of pursuit matrices. The user is allowed to set up the first interval angle according to actual demands.

Step S1$b$: defining the pursuit matrix related to the input signal matrix as a first pursuit matrix, and performing a residual value calculation using the first pursuit matrix and the input signal matrix. Therein, in the embodiment, the first calculation model uses a least square method for residual value calculation.

Step S1$c$: comparing the residual value with a residual threshold value. If the residual value presents a singular sharp reduction and is lower than or equal to the residual threshold value (indicating that the first pursuit matrix satisfies the conditions of the first calculation model), the first calculation model obtains the amount and the rough object angle of the target object. If the residual value is larger than the residual threshold value, the method proceeds to step S1$d$. Therein, if the residual value is larger than the residual threshold value, it is indicated that there may by a plurality of target objects, or that there is a correlation between the first pursuit matrix and the input signal matrix, but the correlation is minor.

Step S1$d$: comparing the reduction degree of the residual value. If the reduction degree of the residual value is larger than a significant threshold value, it is indicated that there is a major correlation between the first pursuit matrix and the input signal matrix; also, the method proceeds to step S1e. If the reduction degree of the residual value is smaller than the significant threshold value, the method goes back to step S1a to repeat the correlation comparison between the input signal matrix and others of the plurality of pursuit matrices, until that the residual value above mentioned is smaller than or equal to the residual threshold value, whereby the first calculation model obtains the amount and the rough object angle of the target object. Therein, when the reduction degree of the residual value is smaller than the significant threshold value, it is indicated that there is a correlation between the first pursuit matrix and the input signal matrix, but the correlation is minor.

Step S1e: storing the first pursuit matrix, and converting the input signal matrix into a second input signal matrix unrelated to the first pursuit matrix; also, the method goes back to step S1a to perform the correlation comparison between the second input signal matrix and others of the plurality of pursuit matrices, until that the residual value mentioned is smaller than or equal to the residual threshold value, whereby the first calculation model obtains the amount and the rough object angle of the target object.

Step S2: converting the input signal matrix into a covariance matrix, and inputting covariance matrix and the target object amount obtained from the first calculation model into a second calculation model for carrying out a singular value decomposition to obtain a noise matrix. Therein, the input signal matrix is converted into the covariance matrix through formula (2):

$$R=E\{yy^H\} \quad (2):$$

Therein, R is the covariance matrix; and y is the input signal matrix.

S3: obtaining an iteration angle range from the rough object angle obtained in S1. Therein, the iteration angle range is formed of the rough object angle plus and minus an allowance angle, and the allowance angle is smaller than the first interval angle.

S4: inputting the plurality of pursuit matrices corresponding to the iteration angle range and the noise matrix into a third calculation model (such as MUltiple SIgnal Classification, MUSIC) for an angle range iteration, thereby obtaining an accurate object angle. Therein, the iteration angle range is orderly inputted into the third calculation model based on a second interval angle unit for carrying out the angle range iteration with the noise matrix.

Further, the second interval angle ranges from 1/10 and 1/100 of the iteration angle range. The third calculation model carries out the iteration of the iteration angle range and the noise matrix through an orthogonal calculation method. After the iteration of the third calculation model, a curve of an angle and power is obtained, and the angle corresponding to the significant peak value on the curve is the accurate object angle.

Figure 3:
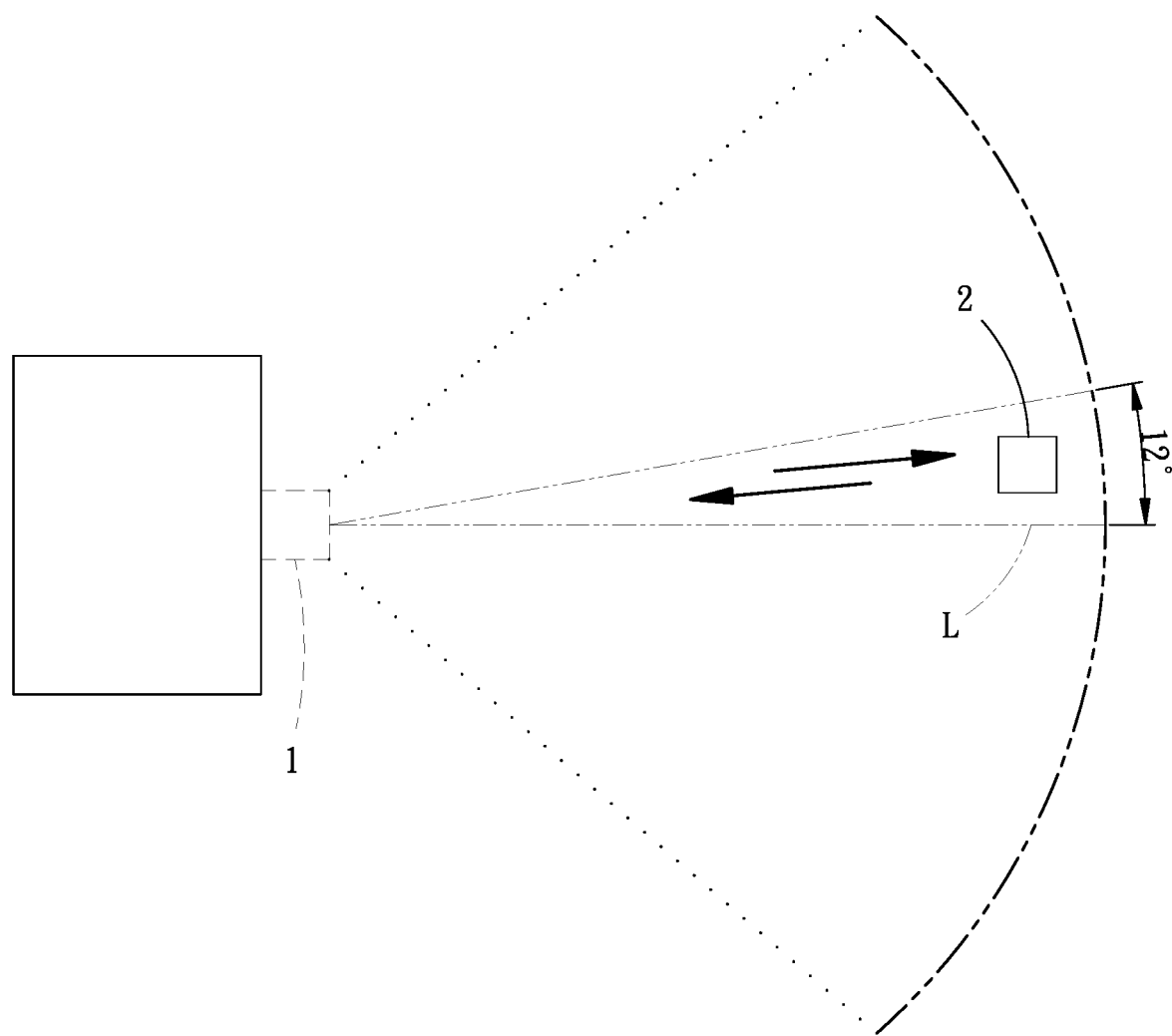
FIG. 3 is a schematic view of the operation status in accordance with the first embodiment of the present invention, illustrating that only one target object exists.
Figure 4:
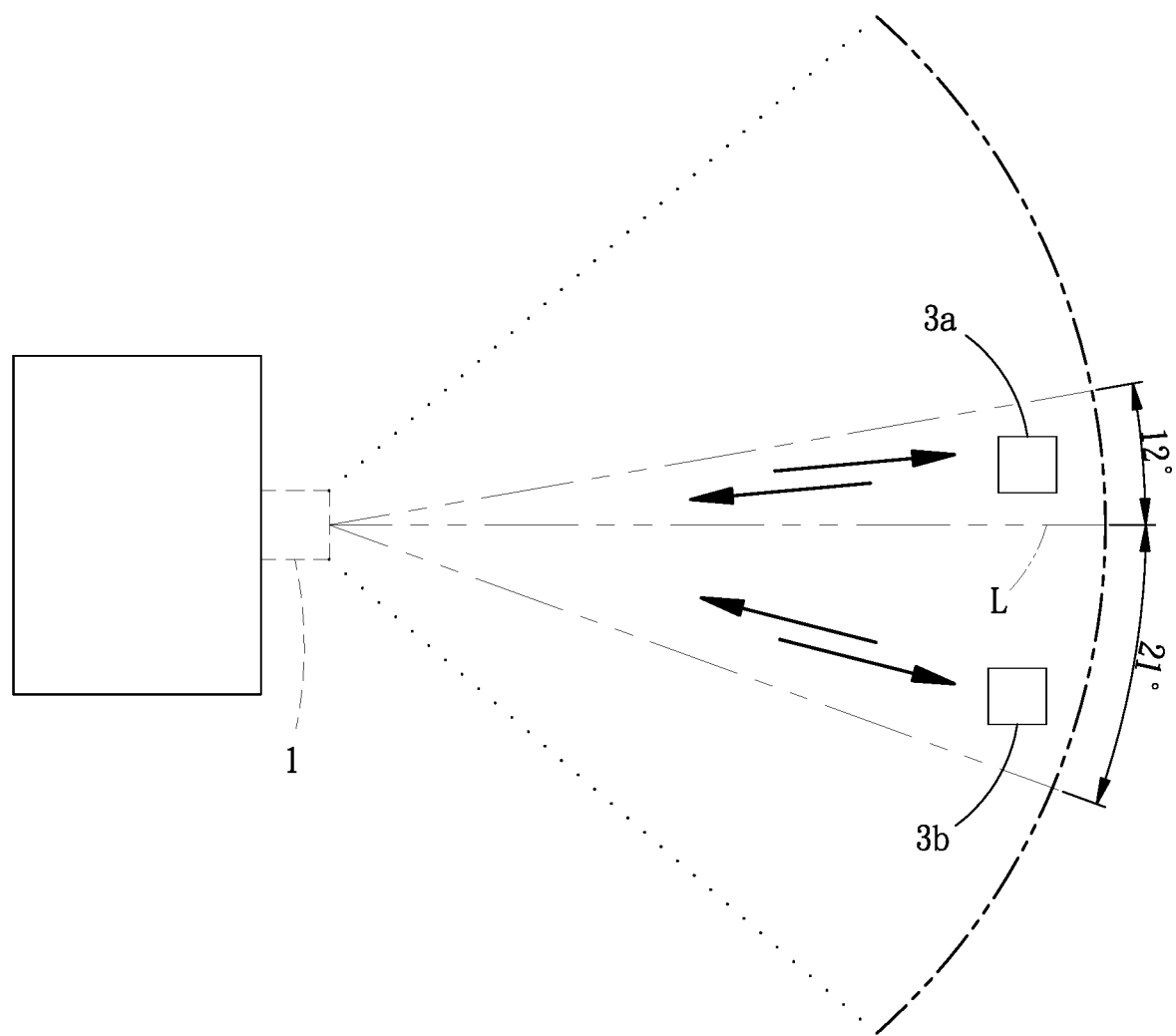
FIG. 4 is a schematic view of the operation status in accordance with the second embodiment of the present invention, illustrating that at least two target objects exist.

Referring to FIG. 3 and FIG. 4, a vehicle radar 1 is provided. The vehicle radar 1 has a detection reference line L, which is arranged in perpendicular to the vehicle radar 1. In the drawing, a direction upward from the detection reference line L is defined as the negative direction, and a direction downward from the detection reference line L is defined as the positive direction. Therein, as shown in FIG. 3 which is in accordance with the first embodiment of the present invention, taking the detection reference line L as the basis, an object 2 exists at an angle of −12 degrees with respect to the vehicle radar 1. As shown in FIG. 4 which is in accordance with the second embodiment of the present invention, taking the detection reference line L as the basis, a first object 3a and a second object 3b exist, wherein the first object 3a is located at −12 degrees with respect to the vehicle radar 1, and the second object 3b is located at 21 degrees with respect to the vehicle radar 1. Regarding the first embodiment, the actual detection steps are illustrated below:

Referring to FIG. 1 to FIG. 3, in step S1, the input signal matrix is inputted into the first calculation model, and the plurality of pursuit matrices are inputted for comparison. When the plurality of pursuit matrices satisfy the conditions of the first calculation model, the amount and the rough object angle of the target objects are obtained. Therein, the input signal matrix is obtained from the reflection signal of the object 2 received by the vehicle radar 1. The plurality of pursuit matrices are formed of angle related steering vectors, and the range of the plurality of pursuit matrices ranges from −90 to 90 degrees. Step S1 proceeds through step S1a to step S1e for identifying if the plurality of pursuit matrices satisfy the conditions of the first calculation model.

In step S1a, the first calculation model orderly compares the correlation between the plurality of pursuit matrices and the input signal matrix based on the first interval angle unit from −90 degrees to 90 degrees. When there is no correlation between one of the plurality of pursuit matrices and the input signal matrix, step S1a is repeated.

In the first embodiment, the first interval angle is 5 degrees. For example, when the first calculation model compares the correlation between the pursuit matrix at −40 degrees and the input signal matrix, based on the fact that the object 2 is at an angle (−12 degrees) which is significantly different from the angle (−40 degrees) of the pursuit matrix, the first calculation model determines that there is no correlation between the pursuit matrix at −40 degrees and the input signal matrix. Then, the first calculation model repeats step S1a for performing the correlation comparison between the plurality of pursuit matrices at the next angle and the input signal matrix.

In contrast, if there is a correlation between one of the plurality of pursuit matrices and the input signal matrix, step S1b is performed. In the first embodiment, when the first calculation model performs the correlation comparison between the pursuit matrix at −10 degrees and the input signal matrix, based on the fact that the object 2 is at an angle (−12 degrees) which is extremely close to the angle (−10 degrees) of the pursuit matrix, the first calculation model determines that there is a correlation between the pursuit matrix at −10 degrees and the input signal matrix, and step S1b is then performed.

In step S1b, the pursuit matrix that are correlated to the input signal matrix are defined as the first pursuit matrix. The first calculation model, according to the first pursuit matrix and the input signal matrix, performs the least square method for calculating the residual value.

In the first embodiment, the first calculation model defines the pursuit matrix at −10 degrees as the first pursuit matrix, and accordingly calculates the residual value. Therein, the initial value of the residual value is 100%.

In step S1c, the residual value is compared with the residual threshold value. If the residual value presents a singular sharp reduction and is lower than or equal to the residual threshold value, it is indicated that the first pursuit matrix satisfies the conditions of the first calculation model, and the first calculation model can obtain the amount and the rough object angle of the target object. If the residual value is larger than the residual threshold value, step S1*d* is performed.

In the first embodiment, the residual threshold value is set at 10%, and the calculated residual value is 5%. Because only one object 2 exists, and the locational angle (−10 degrees) of it is extremely close to the angle (−10) of the first pursuit matrix, the residual value presents a singular sharp reduction to be lower than the residual threshold value (5%<10%). Therefore, the first calculation model obtains the rough object angle as −10 degrees. Also, because the residual value is lower than the residual threshold value (5%<10%) after a singular sharp reduction, the first calculation model obtains the fact that there is only one target object.

Based on the fact that, in the first embodiment, the amount (1) and the rough object angle (−10 degrees) of the target object are obtained in step S1*c*, the objective (obtaining the amount and the rough object angle of the target object) of step S1 is achieved, so that step S1*d* and step S1*e* are no longer needed to be carried out. The method proceeds to step S2.

In step S2, the input signal matrix is converted into a covariance matrix. The covariance matrix and the target object amount are inputted into the second calculation model for carrying out a singular value decomposition (SVD) to obtain a noise matrix. In the first embodiment, the covariance matrix and the target object amount (1) are inputted into the second calculation model for carrying out a singular value decomposition to obtain the noise matrix.

In step S3, the iteration angle range is obtained from the rough object angle plus and minus the allowance angle, wherein the allowance angle is smaller than the first interval angle. In the first embodiment, the allowance angle is set to be 3 degrees. Therefore, the iteration angle range is from −7 degrees to −13 degrees based on the rough object angle (−10 degrees) plus and minus the allowance angle (3 degrees). Therein, the allowance angle (3 degrees) is smaller than the first interval angle (5 degrees).

In step S4, the plurality of pursuit matrices corresponding to the iteration angle range and the noise matrix are inputted into a third calculation model, such that the third calculation model carries out an angle range iteration through an orthogonal calculation method, thereby obtaining the accurate object angle. Therein, the plurality of pursuit matrices corresponding to the iteration angle range are orderly inputted into the third calculation model based on the second interval angle unit.

In the first embodiment, the second interval angle is set as 0.1 degrees. The plurality of pursuit matrices corresponding to the iteration angle range (−7 to −13 degrees) are orderly inputted based on the second interval angle (0.1 degree) unit together with the noise matrix into the third calculation model (such as MUltiple SIgnal Classification, MUSIC). Therefore, the third calculation model orderly carries out the angle iteration with the plurality of pursuit matrices corresponding to the iteration angle range (−7 to −13 degrees) and the noise matrix through orthogonal calculation method, thereby obtaining the accurate target object angle (−12 degrees).

Therein, with the iteration of the third calculation model, the curve of the angle and power is obtained. Because the locational angle of the object 2 is −12 degrees, the curve would only contain one significant peak value at the position corresponding to −12 degrees, indicating that the accurate angle is −12 degrees.

Accordingly, referring to FIG. 3, in the first embodiment, the vehicle radar 1 detects that there is an object 2 existing at the locational angle of −12 degrees through steps S1 to S4 of the present invention, and no other objects exist at other angles.

Regarding the second embodiment, the actual detection steps are illustrated below.

Referring to FIG. 1 to FIG. 4, in step S1, the input signal matrix is inputted into the first calculation model, and the plurality of pursuit matrices are inputted for comparison. When the plurality of pursuit matrices fulfill the conditions of the first calculation model, the amount and the rough object angle of the target object are obtained. Therein, the input signal matrix is obtained from the reflection signal of the first object 3*a* and the second object 3*b* received by the vehicle radar 1. The plurality of pursuit matrices are formed of angle related steering vectors, and the range of the plurality of pursuit matrices ranges from −90 to 90 degrees. Step S1 proceeds through step S1*a* to step S1*e* to identify if the plurality of pursuit matrices fulfill the conditions of the first calculation model.

In step S1*a*, the first calculation model orderly compares the correlation between the plurality of pursuit matrices and the input signal matrix based on the first interval angle unit from −90 degrees to 90 degrees. When there is no correlation between one of the plurality of pursuit matrices and the input signal matrix, step S1*a* is repeated.

In the second embodiment, the first interval angle is set at 5 degrees. For example, when the first calculation model compares the correlation between the pursuit matrix at −40 degrees and the input signal matrix, based on the fact that the locational angle of the first object 3*a* (−12 degrees) and the locational angle of the second object 3*b* (21 degrees) are significantly different from the angle (−40 degrees) of the pursuit matrix, the first calculation model determines that there is no correlation between the pursuit matrix at −40 degrees and the input signal matrix. Then, the first calculation model repeats step S1*a* for performing the correlation comparison between the plurality of pursuit matrices at the next angle and the input signal matrix.

In contrast, if there is a correlation between one of the plurality of pursuit matrices and the input signal matrix, step S1*b* is performed. In the second embodiment, when the first calculation model performs the correlation comparison between the pursuit matrix at −15 degrees and the input signal matrix, based on the fact that the first object 3*a* is at the angle (−12 degrees) which is slightly different from the angle (−15 degrees) of the pursuit matrix, the first calculation model determines that there is a correlation between the pursuit matrix at −15 degrees and the input signal matrix, and step S1*b* is then performed.

In step S1*b*, the pursuit matrix that is correlated to the input signal matrix is defined as the first pursuit matrix. The first calculation model, according to the first pursuit matrix and the input signal matrix, performs the least square method for calculating the residual value.

In the second embodiment, the first calculation model defines the pursuit matrix at −15 degrees as the first pursuit matrix, and accordingly calculates the residual value. Therein, the initial value of the residual value is 100%.

In step S1*c*, the residual value is compared with the residual threshold value. If the residual value presents a singular sharp reduction and is lower than or equal to the residual threshold value, it is indicated that the first pursuit matrix satisfies the conditions of the first calculation model, and the first calculation model can obtain the amount and the rough object angle of the target object. If the residual value is larger than the residual threshold value, step S1d is performed.

In the second embodiment, the residual threshold value is set at 10%, and the calculated residual value is 90%. The residual value is still larger than the residual threshold value (90%>10%), so that the method has to proceed to the next step (step S1d).

In step S1d, the reduction degree of the residual value is compared. If the reduction degree of the residual value is smaller than the significant threshold value, the method goes back to step S1a to repeat the correlation comparison between the input signal matrix and others of the plurality of pursuit matrices, until that the residual value above mentioned is smaller than the residual threshold value. When the reduction degree of the residual value is larger than the significant threshold value, step S1e is performed.

In the second embodiment, the significant threshold value is set at 35%, and the calculated residual value is 90%. However, the reduction degree (10% reduction) of the residual value is smaller than the significant threshold value (35%), meaning that there is a correlation between the first pursuit matrix (at −15 degrees) and the input signal matrix, but the correlation is not major. Therefore, the first calculation model goes back to step S1a to perform the correlation comparison between the input signal matrix and the next pursuit matrix (at −10 degrees).

Accordingly, the first calculation model repeats steps S1a to S1d. In step S1a, because the locational angle (−12 degrees) of the first object 3a is slightly different from the angle (−10 degrees) of the pursuit matrix, the first calculation model determines that there is a correlation between the pursuit matrix at −10 degrees and the input signal matrix. In step S1b, the pursuit matrix at the angle of −10 degrees is defined as the first pursuit matrix, and the residual value is accordingly calculated. Meanwhile, the initial value of the residual value is 90%. In step S1c, the calculated residual value is 50%, and the residual value is still larger than the residual threshold value (50%>10%). Therefore, the method has to proceed to step S1d. In step S1d, the reduction degree of the residual value (reduced by 40% from 90% to 50%) is larger than the significant threshold value (35%), so that the method proceeds to step S1e. Therein, the reduction degree (40%) of the residual value is larger than the significant threshold value, meaning that there is a major correlation between the first pursuit matrix (at the angle of −10 degrees) and the input signal matrix.

In step S1e, the first pursuit matrix is stored, and the input signal matrix is converted into the second input signal matrix which is unrelated to the first pursuit function; also, the method goes back to step S1a to perform the correlation comparison between the second input signal matrix and others of the plurality of pursuit matrices, until that the residual value is lower than or equal to the residual threshold value, whereby the first calculation model obtains the amount and the rough object angle of the target object.

In the second embodiment, the first pursuit matrix (at the angle of −10 degrees) is stored, and the input signal matrix is converted into the second input signal matrix (unrelated to the angle of −10 degrees) which is unrelated to the first pursuit matrix (at −10 degrees). Then, the method goes back to step S1a to perform the correlation comparison between the second input signal matrix and the next pursuit matrix (at the angle of −5 degrees), until that the residual value is lower than or equal to the residual threshold value (10%). Therein, the first pursuit matrix (at −10 degrees) is stored, meaning that one of the rough object angles is −10 degrees.

As illustrated above, in the second embodiment, the first calculation model determines that, through steps S1a to S1e, there are two target objects (first object 3a and second object 3b), and the rough object angle of the objects is −10 degrees and 20 degrees, respectively.

In step S2, the input signal matrix is converted into the covariance matrix. The covariance matrix and the target object amount are inputted into the second calculation model for singular value decomposition (SVD) to obtain a noise matrix. In the second embodiment, the covariance matrix and the target object amount (2) are inputted into the second calculation model for singular value decomposition to obtain the noise matrix.

In step S3, the iteration angle range is obtained from the rough object angle plus and minus the allowance angle, wherein the allowance angle is smaller than the first interval angle. In the second embodiment, the allowance angle is set to be 3 degrees. Therefore, the iteration angle ranges are from −7 degrees to −13 degrees and 17 degrees to 23 degrees based on the rough object angles (−10 degrees and 20 degrees) plus and minus the allowance angle (3 degrees). Therein, the allowance angle (3 degrees) is smaller than the first interval angle (5 degrees).

In step S4, the plurality of pursuit matrices corresponding to the iteration angle range and the noise matrix are inputted into a third calculation model, such that the third calculation model carries out the angle iteration through the orthogonal calculation method, thereby obtaining the accurate object angle. Therein, the plurality of pursuit matrices corresponding to the iteration angle range are orderly inputted into the third calculation model based on the second interval angle unit.

In the second embodiment, the second interval angle is set as 0.1 degrees. The plurality of pursuit matrices corresponding to the iteration angle range (−7 to −13 degrees and 17 to 23 degrees) are orderly inputted based on the second interval angle (0.1 degrees) unit together with the noise matrix into the third calculation model. Therefore, the third calculation model orderly carries out the angle iteration with the plurality of pursuit matrices corresponding to the iteration angle range (−7 to −13 degrees and 17 to 23 degrees) and the noise matrix through the orthogonal calculation method, thereby obtaining the accurate target object angle (−12 degrees and 21 degrees).

Figure 5:
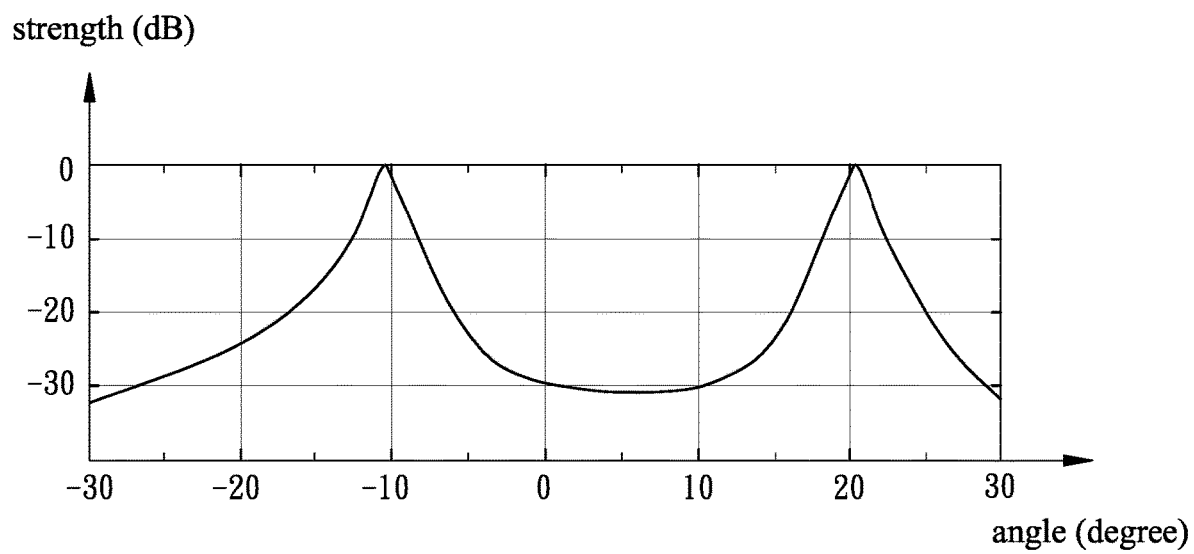
FIG. 5 is a curve diagram of the second embodiment of the present invention, illustrating that the target objects are located at a −12-degree location and a 21-degree location, respectively.

Therein, referring to FIG. 5, with the iteration of the third calculation model, the curve of the angle and power is obtained. Because the locational angle of the first object 3a is −12 degrees and the locational angle of the second object 3b is 21 degrees, the curve would only have significant peak values at the positions corresponding to −12 degrees and 21 degrees, indicating that the accurate angles are −12 degrees and 21 degrees.

Accordingly, referring to FIG. 4, in the second embodiment, the vehicle radar 1 detects that, through steps S1 to S4, there are a first object 3a located at the angle of −12 degrees and a second object 3b located at the angle of 21 degrees, with no other objects existing at other angles.

Figure 6:
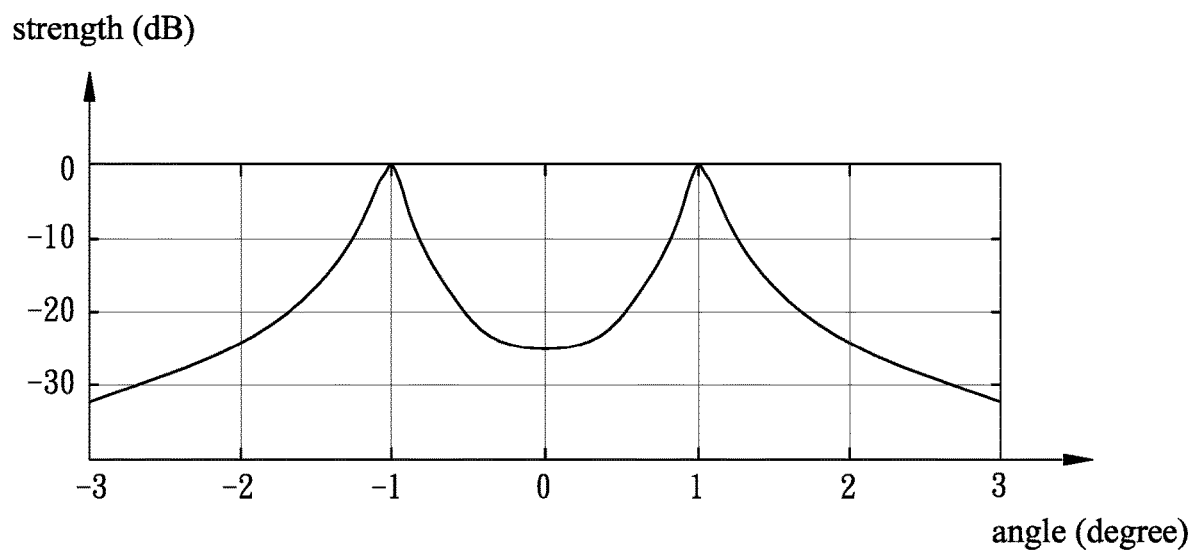
FIG. 6 is a curve diagram of another embodiment of the present invention, illustrating that the target objects are located at a −1-degree location and a 1-degree location, respectively.

Furthermore, referring to FIG. 6, in another embodiment of the present invention, through the calculation from step S1 to step S4, the obtained curve contains significant peak values at the positions of −1 degree and 1 degree, indicating that there is a target object at the −1 degree and 1 degree, respectively. More particularly, as shown by FIG. 6, it is clear that even if different target objects are extremely close to each other (at the angle of −1 degree and 1 degree), the curve is still able to accurately present significant peak values at the position of corresponding angles (−1 degree and 1 degree). Therefore, the user is allowed to efficiently and clearly know that there is a target object at the location of −1 degree and 1 degree, respectively through the curve.

With the foregoing configuration, advantages of the present invention will be illustrated below.

The present invention carries out the calculation on a larger scale first through the first calculation model, such that most angles unrelated to the input signal matrix are excluded first, so as to obtain the target object amount and the rough object angle, increasing the calculation speed of the present invention.

The present invention, through the combination of the second calculation model and the third calculation model, break down the rough object angle and obtain the accurate angle through angle iteration. Therefore, the present invention identifies the target object location with higher accuracy.

Through the noise matrix calculated by SVD and the angle iteration through orthogonal calculation method, the curve obtained by the third calculation model of the present invention only shows significant peak value at the position corresponding to the accurate object angle. Therefore, the user is allowed to clearly know the angle information of the target object.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for estimating object angle with high-angle analysis using large-scale MIMO array antenna, which receives an input signal matrix through an array antenna, and the input signal matrix is a transmission signal or reflection signal of at least one target object, the method comprising following steps:
   step S1: inputting an input signal matrix to a first calculation model, and inputting a plurality of angle related pursuit matrices for comparison; when the plurality of pursuit matrices satisfy conditions of the first calculation model, a target object amount and a rough object angle with respect to a location of a target object are obtained;
   step S2: inputting the target object amount and the input signal matrix to a second calculation model for carrying out a singular value decomposition, and obtaining a noise matrix;
   S3: obtaining an iteration angle range from the rough object angle in S1; and
   S4: inputting the plurality of pursuit matrices corresponding to the iteration angle range and the noise matrix to a third calculation model for an angle range iteration, thereby obtaining an accurate object angle.

2. The method of claim 1, wherein the step S1 further comprises a step S1$a$: the first calculation model carrying out a comparison to identify if there is a correlation between the input signal matrix and the plurality of pursuit matrices; if there is no correlation between one of the plurality of pursuit matrices and the input signal matrix, step S1$a$ is repeated for carrying out the correlation comparison between the next one of the plurality of pursuit matrices and the input signal matrix; if there is a correlation between one of the plurality of pursuit matrices and the input signal matrix, a step S1$b$ is then performed: carrying out a residual value calculation according to the pursuit matrix and the input signal matrix that are related.

3. The method of claim 2, wherein the step S1$b$ defines the pursuit matrix related to the input signal matrix as a first pursuit matrix and performs the residual value calculation using the first pursuit matrix and the input signal matrix.

4. The method of claim 3, wherein the step S1 further comprises a step S1$c$: comparing the residual value with a residual threshold value; if the residual value presents a singular sharp reduction and is lower than or equal to the residual threshold value, the first calculation model obtains the target object amount and the rough object angle; if the residual value is larger than the residual threshold value, a step S1$d$ is performed: carrying out a comparison of the reduction degree of the residual value.

5. The method of claim 4, wherein, in the step S1$d$, if the reduction degree of the residual value is larger than a significant threshold value, a step S1$e$ is performed: storing the first pursuit matrix, and converting the input signal matrix into a second input signal matrix unrelated to the first pursuit matrix, and proceeding to step S1$a$ to perform the correlation comparison between the second input signal matrix and others of the plurality of pursuit matrices; if the reduction degree of the residual value is smaller than the significant threshold value, the step S1$d$ goes back to the step S1$a$ to carry out the correlation comparison between the input signal matrix and others of the plurality of pursuit matrices.

6. The method of claim 2, wherein, in the step S1$a$, a scope of angle of the plurality of pursuit matrices ranges from −90 to 90 degrees, and the corresponding plurality of pursuit matrices are orderly compared with the input signal matrix for correlation comparison based on a first interval angle as a unit.

7. The method of claim 6, wherein the first interval angle ranges from $\frac{1}{18}$ and $\frac{1}{180}$ of the angle range of the plurality of pursuit matrices.

8. The method of claim 3, wherein, in the step S1$b$, the first calculation model calculates the residual value through a least square method.

9. The method of claim 1, wherein, in the step S2, the input signal matrix is first converted into a covariance matrix and then undergoes the singular value decomposition with the target object amount.

10. The method of claim 6, wherein, in the step S3, the iteration angle range is obtained from the rough object angle plus and minus an allowance angle.

11. The method of claim 10, wherein the allowance angle is smaller than the first interval angle.

12. The method of claim 10, wherein, in the step S4, the iteration angle range is orderly inputted to the third calculation model for the angle range iteration with the noise matrix based on a second interval angle as a unit.

13. The method of claim 12, wherein the second interval angle ranges from $\frac{1}{10}$ and $\frac{1}{100}$ of the angle range of the iteration angle range.

14. The method of claim 1, wherein, in the step S4, the third calculation model carries out the iteration with the iteration angle range and the noise matrix through an orthogonal calculation method.

15. The method of claim 1, wherein, in the step S4, after the iteration of the third calculation model, a curve of an angle and power is obtained, and an angle corresponding to a significant peak value on the curve is the accurate object angle.

16. The method of claim 1, wherein the input signal matrix is obtained from a reflection signal of the target object by the array antenna of a radar disposed on a vehicle.

* * * * *